United States Patent [19]
Tsaur et al.

[11] Patent Number: 6,066,613
[45] Date of Patent: May 23, 2000

[54] AQUEOUS SOLUTION COMPOSITIONS COMPRISING POLYMER HYDROGEL COMPOSITIONS

[75] Inventors: Liang Sheng Tsaur, Norwood; Shiji Shen, River Edge, both of N.J.; Margaret Jobling, Bebington, United Kingdom; Michael Paul Aronson, West Nyack, N.Y.

[73] Assignee: Lever Brothers Company, New York, N.Y.

[21] Appl. No.: 08/965,138

[22] Filed: Nov. 6, 1997

Related U.S. Application Data

[62] Division of application No. 08/703,116, Aug. 27, 1996, Pat. No. 5,726,138.

[51] Int. Cl.⁷ ....................................................... C11D 3/37
[52] U.S. Cl. .................... 510/403; 510/418; 510/434; 510/438; 510/451; 510/470; 510/475; 510/476; 510/477
[58] Field of Search ..................................... 510/451, 417, 510/418, 158, 470, 475, 500, 476, 477, 437, 438, 434, 403

[56] References Cited

U.S. PATENT DOCUMENTS

| | | | |
|---|---|---|---|
| 4,777,089 | 10/1988 | Takizawa et al. | 428/402.22 |
| 5,002,680 | 3/1991 | Schmidt et al. | 252/90 |
| 5,089,269 | 2/1992 | Noda et al. | 424/456 |
| 5,281,355 | 1/1994 | Tsaur et al. | 252/174.13 |
| 5,281,356 | 1/1994 | Tsaur et al. | 252/174.13 |
| 5,281,357 | 1/1994 | Morgan et al. | 252/174.13 |
| 5,759,969 | 6/1998 | Tsaur | 510/158 |

FOREIGN PATENT DOCUMENTS

| | | |
|---|---|---|
| 355908 A1 | 2/1990 | European Pat. Off. . |
| WO 94/03152 A2 | 2/1994 | WIPO . |

*Primary Examiner*—John R. Hardee
*Attorney, Agent, or Firm*—Ronald A. Koatz

[57] ABSTRACT

The invention relates to hydrogel dispersions/particles capable of trapping water insoluble beneficial agent, yet capable of disintegrating smoothly to impart desirable in use characteristics.

16 Claims, No Drawings

AQUEOUS SOLUTION COMPOSITIONS COMPRISING POLYMER HYDROGEL COMPOSITIONS

This is a Divisional Application of Ser. No. 08/703,116, filed Aug. 27, 1996 now U.S. Pat. No. 5,726,138.

BACKGROUND OF THE INVENTION

FIELD OF THE INVENTION

The present invention relates to novel large hydrogel particles suspended in an aqueous medium and to a continuous extrusion/mixing process for making this kind of hydrogel particles. The hydrogel particles comprise two different high molecular weight polymers. One is insoluble in the said aqueous medium and is used for network formation and gel integrity. The other is soluble in the said aqueous medium and helps control gel swellability and gel strength. Water insoluble materials are entrapped or encapsulated inside the network formed by these two polymers and are able to be more efficiently delivered from the aqueous composition (e.g., liquid cleanser containing the hydrogel particles). Gel particles with controllable size and controllable gel strength are prepared simply by first adding (e.g. injecting) an aqueous solution containing the said two polymers and the water insoluble material into the said aqueous medium to form elongated soft polymer gel noodles; and the noodles are then cut/broken (e.g., through mixing or mechanical agitation) into desirable gel particle size.

BACKGROUND OF THE INVENTION

Liquid cleansers or other compositions that can deliver skin benefit agents to provide some kind of skin benefits are desired and are known in the art. The use of silicone oil droplets to provide enhanced moisturization benefits, for example, is known.

One method used for enhancing delivery of benefit agents (e.g., silicone and vegetable oil) to the skin or hair is through the use of cationic hydrophilic polymers such as Polymer JR$^{(R)}$ from Amerchol or Jaguar$^{(R)}$ from Rhone Poulenc. This method is disclosed, for example, in EP 93,602; WO 94/03152; and WO 94/03151. In each of these references, both the deposition polymer and the generally small sized silicone particles are uniformly distributed throughout the entire liquid cleanser composition (i.e. there are no concentrated "pockets" of benefit agent).

In other references, hydrophilic polymers are themselves incorporated into liquid cleansers or aqueous solutions to provide various benefits. For example, hydrophilic polymers such as guar gum, polyacrylamides, polyacrylic acid and polymer JR$^{(R)}$ are disclosed in U.S. Pat. Nos. 4,491,539; 4,556,510; 4,678,606; 5,002,680 and 4,917,823 as thickeners, lather modifying agents or skin feel agents. Again, in all cases, the polymers are uniformly incorporated or distributed throughout the entire surfactant composition to provide the claimed benefits.

In no reference is there taught that enhanced deposition of water-insoluble skin benefit agent from cleanser or aqueous medium; or that enhanced in-use cleanser properties by hydrophilic polymer can be achieved using separate hydrogel particles or dispersion acting as a type of structure to contain or entrap the benefit agent in a concentrated form.

Unexpectedly, applicants have now found that, if the benefit agent is incorporated into a liquid composition in the form of an integral hydrogel carrier containing the benefit agent (i.e., discrete aqueous phase trapping the benefit agent), then the level of deposition of the benefit agent on the skin or other substrate is significantly enhanced compared to either typical liquid or to a liquid gel composition containing a polymer agent (typically, a cationic deposition agent such as a cationic guar) to help deposit the benefit agent. The amount of deposition is also higher than for compositions having oil droplets dispersed throughout the composition in the absence of a deposition aid, particularly when small sized particles are used. Other than enhanced deposition, applicants have also found that the separate hydrogel particles enhance the cleanser's in-use sensory properties (i.e., smooth and creamy feel) when the cleanser or aqueous composition generally is rubbed on the skin.

Attempts have been made in the art to deliver some beneficial material in gel particles, but none has been successful in both retaining the agent in composition while easily delivering it at end use (e.g., rubbing).

U.S. Pat. No. 5,089,269 to Noda et al., for example, discloses a cosmetic composition containing improved gelatin capsules containing hydrophobic component coated by a gelatin film swollen with water. Previous gelatin gel or other hydrogels such as agar, alginate or carrageenan coated capsules required a strong breaking force to break the capsule to release the encapsulated ingredients. In some instance these capsules were only slid over skin surface when they were rubbed onto the skin. This patent claimed improved gelatin capsules that overcame the above non-desirable properties. However, similar problem occurred, as described in the patent, when the improved capsule was smaller than 100 um or larger than 1000 um. The improved gel coated capsules either became too rigid to be broken or tended to escape from the fingers of palm during application. Thus, neither this or other art teaches hydrogel compositions such as that of the invention which can retain benefit agent and efficiently release them as desired. Further the reference fails to teach a method of forming such hydrogel containing aqueous composition.

EP 0,355,908 A1 Patent claims a process to make polysaccharide gel particles such as agar, carrageenan or gellan gel particles with size less than 100 um for food, skin lotions or cleansers applications. The patent also claimed that water-insoluble substances suitable for personal care products may be included inside the gel particles. This kind of gel particles, without further modification, is again too rigid to easily break and does not provide a smooth rub-in properties when the particle size is large.

U.S. Pat. Nos. 4,777,089 to Takizawa and 4,908,223 to Takizawa, disclose microcapsule containing hydrous composition prepared by simple coacervation process. In accordance with these patents, the capsule was prepared using two different water soluble polymers by simple coacervation process. Upon addition of organic or inorganic salts the first polymer phase separated and the second polymer underwent no phase separation. Without the second polymer, the first polymer failed to enclose the capsule core material or the capsule became agglomerated into a coarse mass if the capsules were formed.

In no reference is there taught that hydrogel particles can be formed using a combination of two different water soluble polymers, nor is there taught the process for making those kind of hydrogel particles.

BRIEF SUMMARY OF THE INVENTION

The present invention relates to aqueous compositions containing novel hydrogel particles formed by two different water soluble polymers. The hydrogel particles "trap" water insoluble beneficial agents in a network formed by these two polymers. The polymer network which entraps the benefit agents disintegrates smoothly when rubbed on a substrate such as skin in order to impart desirable in use characteristics (e.g., smooth, rich, creamier feel) to the composition. More particularly, the aqueous composition comprises:

(1) 40 to 95% by wt. of an aqueous solution with viscosity higher than 300 centipoise (cps), preferably higher than 1,000 cps, more preferably higher than 3,000 cps, wherein said aqueous solutions contains 0% to 60%, preferably 2% to 40%, surfactant and wherein said surfactant, if present, is selected from the group consisting of anionic, nonionic, cationic, zwitterionic, amphoteric surfactant and mixtures thereof; and (2) 5 to 60% by wt. of a hydrogel composition comprising:

(a) 0.1 to 30% by wt. of hydrogel composition, preferably 0.3–15% of at least one polymer which is soluble in water, but which is insolubilized when placed in said aqueous solution; and (b) 0.2 to 30%, preferably 0.5–10% by wt. of hydrogel composition of at least a second polymer which is soluble in water and either soluble or dispersible in said aqueous surfactant solution; and (c) 1.0 to 60% by wt., preferably 5 to 40% by wt. of a water insoluble beneficial agent which is entrapped in a network formed by polymers (a) and (b); wherein particles of said benefit agent have a particle size of about 0.2 to 200 micrometers;

said hydrogel having a particle size in the range of from about greater than 25 micrometers, preferably larger than 100 micrometers, more preferably greater that 200 micrometers up to about several centimeters.

In a second embodiment of the invention, the aqueous composition containing the novel hydrogel particles is prepared first by adding (e.g., injecting) a polymer solution containing the said two polymers and the water insoluble material into the said aqueous medium to form elongated (in theory, there is no limit to the size of the noodle since it can be continuously extruded), soft (i.e., rigid enough to hold benefit agent, but soft enough to be broken down initially into smaller particles and later to deliver benefit agent to skin) polymer gel noodles which are then cut into the desirable gel particle size. More specifically, the aqueous composition is prepared as follows:

(a) dissolving the first and the second polymer in water to form a polymer solution and dispersing the water insoluble material into the prepared polymer solution to form a hydrogel precursor solution;

(b) formulating the aqueous composition such that the first polymer is not soluble in said aqueous composition due to chemical or physical interaction and the second polymer is either soluble or dispersible; and (c) injecting the hydrogel precursor solution (a) into the aqueous composition (b) to form elongated soft, hydrogel noodles and breaking the elongated soft noodles to hydrogel particles using low shear mixing device.

The second polymer or polymers (2)(b) forming the hydrogel composition is a property modifying polymer which is required (1) to help stabilize benefit agent in the polymer hydrogel system and (2) to help provide the proper gel strength of the overall hydrogel composition.

DETAILED DESCRIPTION OF THE INVENTION

In one embodiment, the present invention relates to hydrogel compositions which are uniformly dispersed and stably suspended in aqueous compositions designed for personal cleansing or skin care applications. The hydrogel composition exists in the aqueous solution as a separate polymer gel phase (i.e., formed when at least one polymer network forming polymer insolubilizes when placed in the aqueous solution; a second property modifying polymer or polymers which is soluble or dispersible in the aqueous solution, is also required) present as macroscopic domains (i.e, having a particle size greater than 25 micrometers, preferably greater than 100 micrometers, up to about several centimeters). Furthermore, these domains are capable of trapping water insoluble agents, hereafter designated the "benefit agent", within the gel structure, i.e., inside a web or network formed by the network forming polymer(s) and the property modifying polymer(s). The hydrogel composition must have sufficient gel strength (generally provided by the first network forming polymer(s)) to retain the integrity of the discrete domains, and to trap and hold the insoluble benefit agent(s) during processing and storage of the aqueous composition. However, the hydrogel must also be soft enough and capable of disintegrating smoothly when the composition is applied to and rubbed onto the intended substrate, such as skin, without causing any undesirable feeling of foreign matter or grittiness, due to the breaking or due to the components of the hydrogel particles. The softness of the gel particles can be manipulated by the amount of property modifying polymer(s) and network forming polymer(s) incorporated into the gel composition.

In a second embodiment of the invention, the hydrogel dispersions or structures are generally prepared by first emulsifying or dispersing the water insoluble benefit agent in an aqueous polymer solution containing both the network forming polymer and the property modifying polymer to form an emulsion or dispersion. This aqueous polymer solution which contains the dispersed benefit agent will henceforth be designated as the "hydrogel precursor solution". The hydrogel precursor solution containing the dispersed benefit agent (and also containing both the first and second polymers defined as (2)(a) and (2)(b) above) is then added or injected to and mixed with an appropriate aqueous solution under such conditions that the hydrogel dispersion precursor becomes insoluble (due to component (2)(a)) upon contact with the aqueous solution to form spherical, noodle shaped or in some cases irregular shaped hydrogel domains uniformly dispersed in said aqueous solution.

Hydrogel dispersion can be accomplished either in a batch wise process or in a continuous process depending on how the hydrogel precursor solution and the aqueous composition are mixed. A batch process such as an overhead mixer or a flotation machine or a continuous process such as a two fluid coextrusion nozzle, an in-line injector, an in-line mixer or an in-line screen can be used to make the hydrogel dispersion. The size of the hydrogel composition in the final composition can be manipulated by changing the mixing speed, mixing time, the mixing device and the viscosity of the aqueous solution. In general, by reducing the mixing speed, decreasing the mixing time, lowering the viscosity of the aqueous solution or using a mixing device that produces less shear force during mixing, one can produce hydrogel compositions of larger size. The size of the hydrogel domains (e.g., particles), should have at least one dimension (e.g., the diameter) that is larger than 25 $\mu$m and preferably larger than 100 $\mu$m to allow optimal transfer of the hydrogel to the substrate during the rubbing process. The diameter may be as high as several centimeters. Injection/low shear mixing processes are preferred for making the hydrogel particles. The hydrogel precursor solution is injected to or co-extruded simultaneously with the aqueous solution to form elongated soft hydrogel noodles. In theory, the noodles have no upper size limit as they are extruded. (As noted, after mixing, hydrogel particles should be at least 25 microns). The prehardened soft hydrogel noodles is then broken to irregular shape of hydrogel particles using low shear mixing devices such as low speed flotation machine or mechanical mixer in a batch process or in-line static mixer or in-line screen in a continuous process. The in-line mixing process is preferred due to better trapping or retention of water insoluble benefit agents inside the gel particles and better control on the size of the hydrogel particles. The prehardened elongated hydrogel noodle should be soft enough such that it can be broken easily at the low shear mixing condition. If the prehardened hydrogel noodle is too rigid then the hydrogel noodles tend to plug the in-line mixer or entangle with the mechanical mixer causing problems during the process. The rigidity of the prehardened hydrogel noodle can be manipulated easily by the composition of the hydrogel precursor solution or the composition of the aqueous solution and the hardening time of hydrogel noodles in the aqueous solution. In general the hydrogel noodle's rigidity can be reduced by reducing the amount of network forming polymer (2(a)) or increasing the level of property modifying polymer (2(b)) in the hydrogel precursor solution; by reducing the hardening time of hydrogel noodle in the aqueous solution; and by reducing the concentration of cross-linking agent in the aqueous solution.

Hydrogel and Aqueous Composition

The hydrogel and aqueous composition comprising such comprise three essential components: i) a hydrogel forming polymer system (comprising a first polymer which insolubilizes upon contact with a suitable aqueous solution for gel network formation; and a second property modifying polymers which stabilizes the benefit agent and/or modifies gel strength); ii) a water insoluble benefit agent (components (i) and (ii) together form the "hydrogel" composition when formed in the aqueous solution composition (iii)); and, iii) an aqueous solution composition capable of suspending the hydrogel and maintaining its integrity due to insolubility of first polymer. Each of these components is described in greater detail below.

As noted, the hydrogel structure or composition comprises (i) a hydrogel forming polymer system (containing at least two polymers) and (ii) a water insoluble benefit agent.

(i) Hydrogel Forming Polymer System

Polymer systems useful for forming hydrogels (component (i) above) with desirable properties comprise in turn (a) a first polymer which is soluble in water but insolubilizes when placed in an aqueous solution composition (component (iii) above); and (b) a second property modifying polymer which ensures the final hydrogel composition is not so strong that it will not disintegrate smoothly when the hydrogel is applied to a substrate, e.g., skin. and but still has sufficient gel strength to retain the benefit agent during processing and storage.

Together polymers (a) and (b) form a web or network which retains the benefit agent. Each of polymers (a) and (b) and the mechanism whereby polymer (a) is insolubilized in the surfactant composition are discussed in greater detail below.

(a) First Polymer

The first polymer is, in its broadest sense, defined as any water soluble polymer that is made insoluble when placed in the aqueous solution composition (iii). This insolubilization is accomplished using one of the following insolubilization mechanisms:

(1) Thermal gelation Suitable polymers that exhibit this type of gelling behavior (i.e., can be made insoluble by thermal gelation) are those that are soluble in water at a temperature higher than about 40–50° C. and which form a gel after the polymer solution is cooled to room temperature. Examples of such polymers include: i) gel forming polysaccharides such as carrageenans or agars. Particularly preferred polymers of this type are the carrageenan polymers. Particularly suitable carrageenans are those manufactured by the FMC corporation and sold under the trade name Gelcarin GP911, and Gelcarin 379; ii) gel forming proteins. Particularly preferred gel forming proteins are gelatins. Suitable gelatins include Gelatin G 9382 and G 2625 sold by Sigma Chemicals; and iii) thermally gelling synthetic polymers such as poly (N-isopropylacrylamide) homo or copolymers or polyacrylate or methacrylate containing polymers that incorporate as one of the monomer units an acrylic or methacrylic ester of a long chain and preferably linear alcohol. Examples of the latter class of polymers are those sold by Landec Labs Inc. under the trade name Inteliners.

(2) Precipitation or coacervation: Suitable polymers which exhibit this type of behavior are those that are soluble in water at room temperature but can be made substantially insoluble by changing the physical or chemical properties of the aqueous solution such as, for example, the pH or electrolyte concentration. One example of a particularly suitable pH sensitive polymer is Chitosan (polyglucosamine) or its various chemically modified variants. Particularly useful chitosans are those sold by Pronova Biopolymers under the trade name Seacure 343, and Seacure 443. These materials have a molecular weight ranging from 10,000 to 100,000. Chitosan is an especially useful network forming polymer for the hydrogel compositions of the present invention because it can be dissolved in an aqueous solution with a pH lower than 4.5 to form a uniform hydrogel precursor solution. Upon mixing this solution with an aqueous solution such as a liquid cleanser which has a typical pH in the range of 5.0 to 7.0, an insoluble polymer is readily formed.

Another class of polymers that form suitable hydrogel networks by precipitation/coacervation are electrolyte sensitive polymers. These polymer will precipitate to form insoluble networks by adding the polymer solution into a liquid cleanser containing high levels of salt or ionic surfactants. Examples of such polymers include: polyvinyl alcohol having a molecular weight greater than 13,000 Daltons and a degree of hydrolysis in the range of 78% to 100%; and hydroxyethylcellulose such as those sold by Aqualon Corp. under the trade name Natrosol.

It should be understood that the same polymer may be in either class (2)(a) (i.e., soluble, but insolubilized upon contact with aqueous surfactant solution); or class (2)(b) (i.e., soluble in both water and aqueous surfactant solutions) depending on what else is in the aqueous solution. Thus, a polymer sensitive to electrolyte concentration might be a class (2)(b) polymer in a composition without electrolyte, but become a class (2)(a) polymer in an aqueous surfactant solution containing sufficient electrolyte to insolubilize the polymer. The same is true if certain polymers become insoluble in the presence of certain cross-linkers. If the cross-linker is not present in the base formulation, the polymer may be a (2)(b) polymer, but, if present, the polymer becomes a (2)(a) polymer.

(3) Cross-linking: Suitable water soluble polymers exhibiting this type of behavior are those that can form water insoluble complexes with a water soluble monomeric or polymeric cross-linker (e.g., salts or polyacrylates). The insoluble polymer network can be formed by reacting the polymer aqueous solution with the cross-linker before or after adding the polymer aqueous solution into the aqueous solution composition. Examples of readily cross-linkable polymers include: κ-Carrageenans which can be cross-linked with potassium ions, alginates which can be cross-linked with a calcium ions or polyvinyl alcohols which can be cross-linked with borax ion.

(b) Second or Property Modifying Polymers

The polymers described above are essential to form the hydrogel as they provide the backbone network without which the hydrogel composition can not exist. However, these polymers alone are usually too rigid to provide a smooth rub-in properties and are not sufficiently surface active in the hydrogel precursor solution to effectively stabilize emulsions of or dispersions of water insoluble benefit agents of the type used in the present invention. A second more surface active water soluble polymer was found necessary in forming such dispersions having the required stability.

A second function of the property modifying polymer concerns its effect on gel strength. As stated above, it is desirable that the hydrogel composition is sufficiently strong such that the dispersed hydrogel domains/particles remain discrete in order to effectively trap the benefit agent within their structure, yet that they be sufficiently soft (non-rigid) that the hydrogel domains/particles rub smoothly into the skin during product use. This balance can be achieved by optimizing the polymer composition of the hydrogel.

It has been found that certain water soluble polymers when incorporated into the hydrogel precursor solution along with the first polymer can effectively modify the gel strength of the hydrogel composition to achieve this balance. The hydrogel strength and the in-use skin feel properties can thus be manipulated easily by controlling the amounts of the network forming polymer (first polymer) and the second property modifying polymer in the hydrogel precursor solution.

A variety of hydrophilic anionic, cationic, amphoteric, and nonionic water soluble polymers can be utilized for these purposes. These second polymers can be soluble in the aqueous solution composition (in contrast to the first polymers which are not) and have a molecular weight greater than 5,000 Daltons, preferably higher than 10,000 Daltons, and most preferably higher than 50,000 Daltons.

Examples of water soluble polymers that have been found useful as property modifying polymers include: i) carboxylic acid containing acrylic polymers such as alkali soluble polyacrylic latexes sold under the trade name of Acrysol or Aculyn by Rohm & Haas and cross-linked polyacrylic acids and copolymers sold by B. F. Goodrich under the trade name Carbopol; ii) nonionic polymers such as polyvinyl alcohol from Air Products sold under the trade name Airvol, polyvinyl pyrrolidone from ISP Technologies Inc., modified corn starch such as those sold under the trade name of Capsule or Purity Gum Bee by National Starch & Chemicals, hydroxyethylcellulose sold by Aqualon under the trade name of Natrosol; hydroxylpropyl methylcellulose from Dow Chemical named Methocel and iii) cationic polymers such as modified polysaccharides including cationic guars available from Rhone Poulenc under the trade names Jaguar C13S, and Jaguar C14S, cationic modified cellulose such as Ucare Polymer JR 30 or JR 40 from Amerchol, synthetic cationic polymers such as polydimethyldialkyammonium chloride homo- or copolymers sold under the trade name Merquat 100, Merquat 550 sold by Calgon, and vinyl pyrrolidone/dimethylamino ethyl methacrylate copolymer sold under the trade name of Gafquat 755 from GAF Chemical.

The second component of the "hydrogel" composition is the benefit agent (component (ii) above). This is described in greater detail below.

(ii) Benefit Agent

Benefit agents in the context of the instant invention are materials that have the potential to provide a positive and often longer term effect to the substrate being cleaned, e.g., to the skin, hair or teeth. In the case of skin, benefit agents suitable for this invention are water insoluble materials that can protect, moisturize or condition the skin after being deposited from the aqueous composition such as a liquid cleansing composition.

Preferred benefit agents include:

a) silicone oils, gums and modifications thereof such as linear and cyclic polydimethylsiloxanes; amino, alkyl alkylaryl and aryl silicone oils;

b) fats and oils including natural fats and oils such as jojoba, soybean, sunflower, rice bran, avocado, almond, olive, sesame, persic, castor, coconut, mink oils; cacao fat, beef tallow, lard; hardened oils obtained by hydrogenating the aforementioned oils; and synthetic mono, di and triglycerides such as myristic acid glyceride and 2-ethylhexanoic acid glyceride;

c) waxes such as carnauba, spermaceti, beeswax, lanolin and derivatives thereof;

d) hydrophobic plant extracts;

e) hydrocarbons such as liquid paraffins, petrolatum, microcrystalline wax, ceresin, squalene, squalane, pristan and mineral oil;

f) higher fatty acids such as lauric, myristic, palmitic, stearic, behenic, oleic, linoleic linolenic, lanolic, isostearic and poly unsaturated fatty acids (PUFA) acids;

g) higher alcohols such as lauryl, cetyl, styrol, oleyl, behenyl, cholesterol and 2-hexadecanol" alcohol;

h) esters such as cetyl octanoate, myristyl lactate, cetyl lactate, isopropyl myristate, myristyl myristate, isopropyl palmitate, isopropyl adipate, butyl stearate, decyl oleate, cholesterol isostearate, glycerol monostearate, glycerol distearate, glycerol tristearate, alkyl lactate, alkyl citrate and alkyl tartrate; sucrose ester sorbitol ester and the like;

i) essential oils such as fish oils, mentha, jasmine, camphor, white cedar, bitter orange peel, ryu, turpentine, cinnamon, bergamot, citrus unshiu, calamus, pine, lavender, bay, clove, hiba, eucalyptus, lemon, starflower, thyme, peppermint, rose, sage, menthol, cineole, eugenol, citral, Citronelle, borneol, linalool, geraniol, evening primrose, camphor, thymol, spirantol, pinene, limonene and terpenoid oils;

j) lipids and lipid like substance such as cholesterol, cholesterol ester ceramides, sucrose esters and pseudoceramides as described in European Patent Specification No. 556 957;

k) vitamins such as vitamin A and E, and vitamin alkyl esters, including vitamin C alkyl esters;

l) sunscreens such as octyl methoxyl cinnamate (Parsol MCX) and butyl methoxy benzoylmethane (Parsol 1789);

m) Phospholipids such as lecithins; n) antimicrobial such as 2-hydroxy-4,2',4'-trichlorodiphenylether (DP300) and 3,4,4'-trichlorocarbanilide (TCC); and mixtures of any of the foregoing components.

Another benefit agent contemplated are water soluble materials (e.g., glycerin, enzyme, α-hydroxy acid) entrapped in any of the oils mentioned above.

The benefit agent is incorporated into the aqueous hydrogel precursor solution (the solution that contains the first polymer and the second property modifying polymers). This can be accomplished simply by mixing the benefit agent with the aqueous hydrogel precursor solution or by pre-emulsifying the benefit agent in an aqueous solution which is then mixed with the hydrogel precursor solution. In the direct mixing process low level of surfactants can be added into the hydrogel precursor solution to enhance emulsification and stability of the skin benefit agent. The benefit agent is present in the aqueous polymer solution in the amount of 5 to 65 by wt. %, preferably 10 to 40 by wt. % of the hydrogel composition. Depending on the mixing conditions, polymer composition (i.e., composition of polymers forming hydrogel) and concentration, the size of the benefit agent particle can vary from 0.2 micrometer up to several hundred micrometers. For better stability and efficient deposition, the particle size of benefit agent is preferably in the range of 5 to 150 micrometers.

As indicated above, the invention comprises an aqueous solution composition comprising the hydrogel composition more fully defined above. The liquid composition itself is described in greater detail below.

(iii) Aqueous Solution Composition

As noted, the invention relates to the aqueous solution composition in which the hydrogel incorporating the benefit agent (i.e., containing the agent in a web produced by polymers (2)(a) and (2)(b)) is dispersed. Depending on the application, the aqueous solution composition can comprises from about 0% to about 60 wt %, preferably 2% to 40 wt % of surfactants selected from any known surfactants suitable for personal care or cleansing applications. In general, for personal application higher level of surfactants typically in the range of 5 to 50 wt. % used. The surfactants are selected from the group consisting of anionic, nonionic, cationic, amphoteric and zwitterionic surfactants and mixtures thereof. It should be noted that surfactants are not a necessary component of the composition and, for example, non-surfactant skin lotion compositions are contemplated.

The aqueous solution composition should be formulated in such a way that the first water soluble polymer becomes insoluble upon contact with the aqueous solution composition. It is also critical that the aqueous solution composition is capable of suspending the dispersed hydrogel phase for hydrogel processing and stable hydrogel suspension. This requires that the liquid compositions have a sufficiently high low-shear viscosity to prevent settling (or creaming) of the hydrogel compositions under the action of gravity during processing and storage. This can be achieved by utilizing aqueous solution compositions formulated to have a viscosity of at least 300 cps, and preferably 1,000 cps, more preferably 3,000 at a shear rate of 10 sec$^{-1}$ at 25° C. This viscosity is generally sufficient to stably suspend the large hydrogel dispersions of the instant invention without appreciable gravitational phase separation. As the particle size of hydrogel dispersion increases, liquids that have a higher viscosity are required to achieve adequate stability.

Viscosity of an aqueous solution composition can be increased either by the inclusion of polymeric, organic or inorganic thickeners in the composition or by the careful selection and combination of surfactants. Both methods are well known in the art. For example, U.S. Pat. Nos. 4,912,823, 4,491,539, 4,556,510, 4,678,606 and 5,002,680 teach the use of polymeric thickeners to increase the viscosity of a liquid cleanser, while U.S. Pat. Nos. 5,236,619, 5,132,037, 5,284,603, 5,296,158 and 5,158,699 disclose ways to formulate a stable viscous liquid composition using an appropriate combination of surfactants.

The surface active agent, when used, can be selected from any known surfactant suitable for topical application to the human body.

One preferred anionic detergent is fatty acyl isethionate of formula

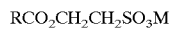
$$RCO_2CH_2CH_2SO_3M$$

where R is an alkyl or alkenyl group of 7 to 21 carbon atoms and M is a solubilizing cation such as sodium, potassium, ammonium or substituted ammonium. Preferably at least three quarters of the RCO groups have 12 to 18 carbon atoms and may be derived from coconut, palm or coconut/palm blends.

Another preferred anionic detergent is alkyl ether sulphate of formula:

$$RO(CH_2CH_2O)_nSO_3M$$

where R is an alkyl group of 8 to 22 carbon atoms, n ranges from 0.5 to 10 especially 1.5 to 8, and M is a solubilizing cation as before.

It should be understood that the anionic surfactant is also intended to encompass fatty acid soaps.

Fatty acid soaps are typically alkali metal or alkanol ammonium salts of aliphatic alkane or alkene monocarboxylic acids. Sodium, potassium, mono-, di and tri-ethanol ammonium cations, or combinations thereof, are suitable for purposes of the invention. The soaps are well known alkali metal salts of natural or synthetic aliphatic (alkanoic or alkenoic) acids having about 8 to 22 carbons, preferably 12 to about 18 carbons. They may be described as alkali metal carboxylates of acrylic hydrocarbons having about 12 to 22 carbons.

Examples of soap which may be used may be found in U.S. Pat. No. 4,695,395 to Caswell et al. and U.S. Pat. No. 4,260,507 (Barrett), both of which are incorporated herein by reference.

Other possible anionic detergents include alkyl glyceryl ether sulphate, sulphosuccinates, taurates, sarcosinates, sulphoacetates, alkyl phosphate, alkyl phosphate esters and acyl lactates, alkyl glutamates and mixtures thereof.

Sulphosuccinates may be monoalkyl sulphosuccinates having the formula:

$$R^5O_2CCH_2CH(SO_3M)CO_2M;$$

and amido-MEA sulphosuccinates of the formula:

$$R^5CONHCH_2CH_2O_2CCH_2CH(SO_3M)CO_2M;$$

wherein $R^5$ ranges from $C_8-C_{20}$ alkyl, preferably $C_{12}-C_{16}$ alkyl and M is a solubilizing cation.

Sarcosinates are generally indicated by the formula:

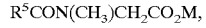
$$R^5CON(CH_3)CH_2CO_2M,$$

wherein $R^5$ ranges from $C_8-C_{20}$ alkyl, preferably $C_{12}-C_{16}$ alkyl.

Taurates are generally identified by the formula:

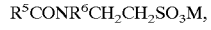
$$R^5CONR^6CH_2CH_2SO_3M,$$

wherein $R^5$ ranges from $C_8-C_{20}$ alkyl, preferably $C_{12}-C_{15}$ alkyl, $R^6$ ranges from $C_1-C_4$ alkyl, and M is a solubilizing cation.

Another useful surfactant is alkylethoxy carboxylate indicated by the following formula:

$$R^5(OCH_2CH_2)_nCOOM,$$

wherein $R^5$ ranges from $C_8$–$C_{20}$ alkyl, preferably $C_{12}$–$C_{16}$ and M is a solubilized cation.

Harsh surfactants such as primary alkane sulphonate or alkyl benzene sulphonate will generally be avoided.

Suitable nonionic surface active agents include alkyl polysaccharides, aldobionamides (e.g., lactobionamides such as taught in U.S. Ser. No. 981,737 to Au et al., hereby incorporated by reference into the subject application), ethyleneglycol esters, glycerol monoethers, polyhydroxyamides (glucamide) including fatty acid amides such as taught in U.S. Pat. No. 5,312,934 to Letton, hereby incorporated by reference into the subject application), primary and secondary alcohol ethoxylates, especially the $C_{8-20}$ aliphatic alcohols ethoxylated with an average of from 1 to 20 moles of ethylene oxide per mole of alcohol.

The surface active agent is preferably present at a level of from 1 to 35 wt. %, preferably 3 to 30 wt. %.

It is also preferable that the composition includes from 0.5 to 15 wt. % of a cosurfactant with skin mildness benefits. Suitable materials are zwitterionic detergents which have an alkyl or alkenyl group of 7 to 18 carbon atoms and comply with an overall structural formula.

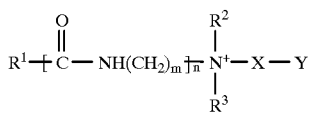

where $R^1$ is alkyl or alkenyl of 7 to 18 carbon atoms, $R^2$ and $R^3$ are each independently alkyl, hydroxyalkyl or carboxyalkyl of 1 to 3 carbon atoms, m is 2 to 4, n is 0 or 1, X is alkylene of 1 to 3 carbon atoms optionally substituted with hydroxyl, and Y is —$CO_2$— or —$SO_3$—.

Zwitterionic detergents within the above general formula include simple betaines of formula:

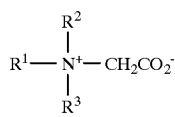

and amido betaines of formula:

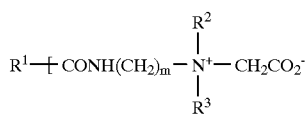

where m is 2 or 3.

In both formulae $R^1$, $R^2$ and $R^3$ are as defined previously. $R^1$ may, in particular, be a mixture of $C_{12}$ and $C_{14}$ alkyl groups derived from coconut so that at least half, preferably at least three quarters of the groups $R^1$ have 10 to 14 carbon atoms. $R^2$ and $R^3$ are preferably methyl.

A further possibility is a sulphobetaine of formula:

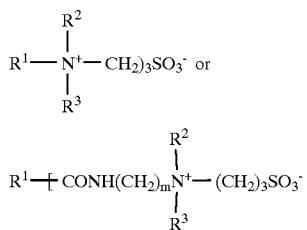

where m is 2 or 3, or variants of these in which —$(CH_2)_3SO_3^-$ is replaced by

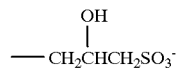

$R^1$, $R^2$ and $R^3$ is these formulae are as defined previously.

Compositions of the invention may be formulated as products for washing the skin or hair, e.g., bath or shower gels, hand washing compositions, facial washing liquids, shampoos; pre and post shaving products; rinse off, wipe off and leave on skin care products.

The compositions of the invention will generally be pourable liquids or semi liquids e.g., pastes and will preferably have a viscosity in the range 1500 to 100,000 mPas measured at a shear rate of $10s^{-1}$ at 25° C. in a Haake Rotoviscometer RV20.

Other typical components of the compositions include opacifiers, preferably 0.2 to 2.0 wt. %; preservatives, preferably 0.2 to 2.0 wt. % and perfumes, preferably 0.5 to 2.0 wt. %.

In a second embodiment of the invention, the invention relates to a process for preparing an aqueous solution comprising hydrogel particles wherein said hydrogel particles have the following composition:

(i) 0.1 to 30% by wt. hydrogel composition of at least one polymer soluble in water which polymer is insolubilized when placed in an aqueous medium;

(ii) 0.2 to 30% by wt. hydrogel composition of a polymer soluble in water, and soluble or dispersible in aqueous surfactant solution; and (iii) 1.0% to 60% water insoluble benefit agent entrapped in a network formed by (i) and (ii);

wherein said hydrogel is greater than 25 micrometers;

and wherein the size of the hydrogel (b) is greater than that of the benefit agent;

wherein said process comprises:

(a) dissolving polymer (i) and (ii) to form a polymer solution in water (b) dispersing component (iii) into the polymer solution to form a hydrogel precursor solution;

(c) formulating said aqueous solution such that the first polymer (i) is not soluble and second polymer (ii) is soluble or dispersible;

(d) adding said hydrogel precursor solution into the aqueous solution to form elongated, soft hydrogel noodles when hydrogel precursor contacts the aqueous solution; and (c) breaking the noodles to hydrogel particles using mechanical mixer or in-line mixer.

In order to better understand the invention the following non-limiting examples are provided. As noted, the examples are not intended to limit the claims in any way.

All percentages mentioned are intended to be percentages by weight unless indicated otherwise.

EXAMPLES

Example 1
Preparation of Hydrogel Dispersions (i.e., Hydrogel Composition) Containing Silicone Oil by a Direct Mixing Process There are a number of ways that a polymeric hydrogel can be dispersed into an aqueous based surfactant composition in such a way that the hydrogel forms discrete domains. All of the techniques we have found useful take advantage of rapid gelation or cross-linking that occur for certain types of water soluble polymers when their solution environment changes, e.g., a change in pH, ionic strength, temperature, type of ion, presence of cross-linker, etc.

This example illustrates how hydrogel dispersion useful in the present invention can be prepared by directly mixing an appropriate hydrogel forming polymer solution (called the hydrogel precursor solution) with a liquid cleanser using conventional mechanical stirrer. In this case, the polymer system is chosen such that the change in pH that arises when the hydrogel precursor solution is mixed with the cleansing composition induces a phase changes (gelation). Gelation is sufficiently rapid that the added precursor hydrogel solution (containing (1) first polymer which insolubilizes when added to aqueous surfactant solution; (2) second property modifying polymer and (3) benefit agent), which itself is water continuous, does not first dissolve in the cleansing composition but rather forms a discrete dispersed aqueous phase.

Preparation of Hydrogel Precursor Solution

A 40% emulsion of silicone oil (60,000 centistokes, ex Dow Corning) was formed by mixing 40 parts of the silicone oil to 60 parts of aqueous polymer solution which contained 1 wt % of Chitosan (first polymer) (Sea Cure 340 ex. Protan), 0.8 wt % of acetic acid and 3 wt % of hydroxyl ethylcellulose (second polymer) (Natrosol 250 MR ex. Aqualon) at 400 rpm for 30 minutes using an overhead stirrer. The emulsion so prepared contained droplets of silicone oil having a broad size distribution ranging from about 4 µm to 50 µm dispersed in the polymer solution.

Preparation of Hydrogel Dispersion by Direct Mixing 12.5 parts of the hydrogel precursor solution containing emulsified silicone oil described above was added to 87.5 parts of a liquid cleanser whose composition is described in Table 1. Mixing was accomplished with an overhead stirrer (Model RW20DZM ex Tekmar). Two dispersions were prepared that had identical chemical composition but differed in the stirring speed used to form the dispersions. In Example 1A, the dispersion was mixed at 80 RPM for 25 minutes while for Example 1B the mixing speed was 200 RPM. Both examples contained irregular shaped hydrogel domains that themselves contained emulsified silicone oil droplets entrapped within the gel matrix.

The compositions of Examples 1A and 1B are detailed in Table 2 along with some of their physical properties.

TABLE 1

| Liquid Cleanser Composition | |
|---|---|
| Ingredient | Wt % |
| Cocamidopropyl Betaine | 5.6% |
| Sodium Cocoyl Isethionate | 3.5% |
| Sodium Laureth Sulfate | 1.4% |
| Glydant XL | 0.14% |
| Ammonium Sulfate | 0.09% |
| Jaguar C13S | 0.9% |
| Perfume | 0.42% |
| Deionized Water | 87.95% |

TABLE 2

Composition and properties of hydrogel dispersions formed by direct mixing.

| Ingredient | Example 1A Wt % | Example 1B Wt % | Example 2 Wt % |
|---|---|---|---|
| Silicone oil | 40% | 40% | 40% |
| Chitosan | 0.6% | 0.6% | 0.6% |
| Hydroxyethylcellulose | 1.8% | 1.8% | — |
| Jaguar C13S | — | — | 1.8% |
| water | to 100 | to 100 | to 100 |
| Silicone Oil drop size | 4–50 µm | 4–50 µm | 1–25 µm |
| Hydrogel domain size | 255 nm | 227 nm | 157 nm |

Example 2
Further Illustration of Hydrogel Dispersion Containing Silicone Oil Prepared by Direct Mixing A hydrogel precursor solution similar to the one described in Example 1 but having a different polymer composition was prepared as follows. 40 parts of 60,000 centipoise silicone oil was emulsified in 60 parts of aqueous polymer gel solution which contained 1 wt % of Chitosan (first polymer) (Sea Cure 340 ex. Protan), 0.8 wt % of acetic acid and 3 wt % of a cationic guar polymer (second polymer) (Jaguar C13S ex. Rhone-Poulenc) at 400 rpm for 30 minutes using an overhead stirrer.

12.5 parts of this hydrogel precursor solution containing emulsified silicone was then added to 87.5 parts of the liquid cleanser described in Table 1 and mixed at 80 rpm for 25 minutes. This process lead to a dispersion that contained irregular shaped particles of hydrogel in which silicone oil droplets were entrapped in the gel matrix. The composition and properties of this dispersion are also summarized in Table 2.

Example 3
Hydrogel Dispersions Containing Silicone Oil Prepared by Extrusion This example demonstrates that hydrogel dispersions useful for the purposes of the present invention can also be prepared by a coextrusion process. Specifically the example illustrates compositions that are prepared by co-extruding a hydrogel precursor solution (containing in this case dispersed silicone oil) with an aqueous liquid cleaner composition by means of a two fluid nozzle. This process produces hydrogel compositions dispersed in the form of noodle shape particles suspended in the liquid cleanser composition. The noodle shape hydrogel dispersion gives a unique appearance to the liquid cleanser. Alternatively, the dispersion can be processed further by any number of shear techniques to chop or subdivide the noodles into a desired size range. The process is illustrated for a silicone oil containing hydrogel composition, but can be used in conjunction with a great variety of materials as will be shown in subsequent examples.

Preparation of Hydrogel Precursor Solution Dispersed Silicone Oil

Silicone oil was mixed with an aqueous solution of a neutralized carboxyl acid containing acrylic copolymer (second polymer) (Aculyn-33, Rohm & Haas) in an aqueous solution with a pH in the range of 7 to 7.5 by mechanical stirring. In this case the Aculyn-33 was used as the property modifying polymer. The oil droplet size, which varied from 5 to 150 $\mu$m in diameter, was controlled by the concentration of Aculyn-33 and the stirring speed. Higher concentration and faster stirring led to smaller oil droplets. An aqueous κ-carrageenan (Gelcarin GP-911, FMC) solution, the first polymer (network forming polymer), was added into the mixture with gentle stirring (<100 rpm) at 45–50° C. For this example two hydrogel precursor dispersions were prepared that differed in the size of the silicone oil droplets. In one dispersion, the silicone oil droplet size was in the range of 2–30 $\mu$m while in the second dispersion the droplet size fell within 40–100 $\mu$m.

Preparation of Hydrogel Dispersion by Coextrusion

The warm (45–50° C.) precursor solution described above was fed into the central orifice of a commercially available nozzle (Series No. 1/4 XA SR450 A ex Bete Fog Nozzle Inc.) by means of a high pressure syringe pump (Syringe pump model 40 ex Harvard Apparatus). Simultaneously, a cool (room temperature ~22° C.) shower gel formulation (composition shown in Table 3) was injected to the outer orifice of the nozzle to form the final product which contained "noodle-shaped" hydrogel composition particles. A high pressure syringe pump was also used to transfer the cleansing composition, in this case a shower gel. The hydrogel and silicone contents in the final dispersion were controlled by controlling the ratio of the flow rates of the hydrogel precursor and the surfactant compositions. This ratio was adjusted to ensure that the final product contained 5 wt. % silicone oil.

The characteristics of the two hydrogel dispersions, Example 3A and Example 3B are summarized in Table 4. They consisted of noodle shaped particles of approximately 1000 $\mu$m in diameter suspended in the shower gel composition of Table 3.

TABLE 3

Surfactant cleansing composition used to prepare hydrogel dispersions of Example 3.

| Ingredient | wt. % |
| --- | --- |
| Sodium Lauryl Ether(3) Sulfate | 4 |
| Cocoamido Propyl Betaine | 1 |
| Dodecyl polyglycoside | 5 |
| Perfume (SG 146, Quest) | 1 |
| Sorbic Acid | 0.37 |
| Sodium Citrate 2H$_2$O | 0.49 |
| Sodium Hydroxide[1] | 1 |
| Carbopol ETD2020[2] | 0.9 |
| Antil 141[3] | 0.97 |
| H$_2$O | to 100 |

[1]Adjust pH to 5.24 ± 0.1 with NaOH
[2]Cross-linked polyacrylic acid
[3]Polyethylene glycol propylene glycol oleate

TABLE 4

Characteristics of "Noodle Shaped" Hydrogel Particles formed by coextrusion (Example 3).

| | Hydrogel Phase | | | Oil Phase Silicone Oil (60,000 cs) | Diameter of |
| --- | --- | --- | --- | --- | --- |
| Ex- ample | Polymer Type | Polymer wt. % | Water wt. % | Droplet Size ($\mu$m) | Noodle's Cross-section ($\mu$m) |
| 3A | Carrageenan/ Aculyn | 1.2/ 0.4 | 38.4 | 60.0 | 40–100 | 1000 |
| 3B | Carrageenan/ Aculyn | 1.2/ 0.4 | 38.4 | 60.0 | 2–30 | 1000 |

Aculyn is neutralized carboxyl acid containing acrylic copolymer.

Example 4

Effect of Polymer Composition on Hydrogel Properties

This method illustrates how the rheological properties of the hydrogel which affect their in-use properties can be manipulated by the selection and concentrations of network-forming (first) and property modifying (second) polymers.

A series of model hydrogel particles were prepared by a cross-linking method using carrageenan as the network polymer and potassium ions as the cross-linking agent. The dispersions were made by a variant of the extrusion process described in Example 3 using an aqueous solution of KCl as the model cleansing composition. The hydrogel dispersions differed only in the concentration of carrageenan (first polymer) used in the hydrogel precursor solution which ranged from 1 to 6 wt %. Approximately spherical particles were formed all having a diameter of about 3000 $\mu$m.

An Instron (Model 1122) was found to be a suitable instrument to differentiate the strength of various gel compositions described above. The measurement procedure was as follows. A hydrogel particle was carefully removed from the dispersion with a spatula and excess liquid was removed by placing them on a kimwipe. The approximate diameter of the hydrogels was measured with calipers. The hydrogel was then transferred to a metal platform base of the Instron and a 10 Newton load was lowered until it came in contact with the hydrogel particle. The Instron was then turned on and the force was measured as a function of distance using a chart recorder. The chart recorder was set at a crosshead speed of 1 mm/min and a chart speed of 50 mm/min which allowed for a 2 Newton full scale load reading. The force was recorded at 0.50 mm, 1.00 mm, and 1.50 mm. The elastic modules of the sample was calculated by dividing the force by the section area of the hydrogel and the strain. It should be noted that the particles remained hydrated during the course of the measurement.

The gel strength measure by the above procedure for the series of model hydrogel particles. These results indicated that the gel strength increased significantly with increasing carrageenan concentration. When the polymer concentration was higher than 2 wt %, the gel felt quite hard to the touch, and did not rub smoothly into the skin. Although such particles might trap benefit agents and remain stable during storage, they would not be optimum for cleansing applications because the delivery of the benefit agent would not be uniform, and the composition would feel gritty. These results also indicate that if it was desired to decrease the gel strength of the hydrogel particles this could only be achieved by decreasing the concentration of polymer within the gel.

This would greatly limits the flexibility of the technology. As will be shown below, this limitation can be overcome by using a second polymer to modify the properties of the hydrogel, e.g., its gel strength.

Another set of model hydrogel particles were prepared by the same procedures used above. Each hydrogel precursor solution contained 2 wt % carrageenan and from 0 to 2 wt % of an acrylic copolymer, Acrysol ASE-60 (Rohm & Haas). This is the second property modifying polymer. The shape and size of the hydrated particles were all very similar and also similar to the all carrageenan hydrogels described previously. Gel results indicate that the gel strength decreased significantly with increasing Acrysol concentration even though the total concentration of polymer increased. Hydrogels containing carrageenan and Acrysol in a weight ratio ranging from 3:1 to 2:1 were capable of effectively trapping benefit agents such as emulsified emollient oil e.g., silicone oil, and yet rubbed smoothly into the skin without noticeable grit.

The above example is set forth for illustrative purposes to show how the gel strength can be tuned by selection of a polymer system comprising an network-forming and property modifying polymer. Care must be taken not to attach too much significance to the exact values of gel strength quoted above. We have found that the quantitative effect of the polymer composition in the hydrogel precursor solution on the strength of a hydrogel particle depends significantly on the nature, particle size, and concentration of a benefit agent that may be dispersed in the precursor solution. Although the trends are the same, the exact values may change. Although complex, one skilled in the art can utilize a combination of polymers broadly falling in the definition of network-forming and property modifying agents to achieve the proper balance of gel strength for each situation.

Example 5
Deposition of Silicone Oil on Skin ex-vivo

The potential of various cleansing compositions to deposit silicone oil onto the skin during the washing process was determined using an ex-vivo model based on pig skin. The procedure is described below.

A 0.5 ml aliquot of the test composition was applied to 2" by 2" square strips of excised pig skin that had first been prewetted with tap water at 37° C. The composition was lathered for 10 seconds and then rinsed for 10 seconds under warm running tap water. The skin was then wiped once with a paper towel to remove excess water and allowed to dry for two minutes. A strip of adhesive tape was then pressed onto the skin for 30 seconds under a load of 10 g/cm$^2$. The adhesive tape employed was J-Lar Superclear (TM) tape having a width of 3 cm. In this test procedure, the silicone, which had deposited on the skin, will subsequently be transferred to the tape along with some of the outer skin layers.

The amounts of silicone and skin adhering to the tape were determined by means of X-ray fluorescence spectroscopy. The tape strips were placed in an X-ray fluorescence spectrometer with the adhesive side facing the beam of this machine. A mask is applied over the tape to define a standardized area in the middle of the tape which was exposed to the X-ray beam. The sample chamber of the machine was placed under vacuum before making measurements and the spectrometer was then used to measure the quantities of silicone and sulphur. The sulphur was representative of the amount of skin which had transferred to the tape.

The amount of silicone and sulphur observed with a clean piece of adhesive tape were subtracted from the experimental measurements. The experimental measurements for successive pieces of tape were added together and the cumulative totals of silicone and sulphur were expressed as a ratio of silicone to sulphur per unit area of skin. A higher Si/S ratio corresponds to a higher deposition level. A total of 10 tape strips were employed for each measurements.

The amount of silicone deposited on excised pig skin determined as described above for the compositions described in Examples 2–3 are listed in Table 5. It is clear from these results that the hydrogel compositions provided significant deposition of silicone oil to the skin in these tests.

TABLE 5

Deposition of Silicone from Shower Gel

| Example No. | Silicone Deposition (Silicon/Sulphur Ratio) |
| --- | --- |
| Example 2 | 1.38 |
| Example 3A | 28.0 |
| Example 3B | 7.1 |
| Control 1 (Note 1) | 0.3 |

(Note 1).
The control in this example is the shower gel composition shown in Table 3 which did not contain any silicone.

Example 6

Hydrogel Dispersions made with Different Polymers

This example illustrates that hydrogel dispersions can be prepared with a variety of polymers provided they possess the required hydrogel forming capabilities and gel strengths. In the composition described below, a cationic polymer Chitosan (first polymer) (Seacure 343 ex. Pronova Biopolymer) was used as the network forming polymer and a cationic modified guar (Jaguar C-13S, Calgon) and a synthetic cationic polymer polydimethyldialkylammonium chloride (Merquat 100, Calgon) were used as the second or property modifying polymers. The hydrogel precursor solution was prepared by mixing 35 parts of 60,000 cps silicone oil with 65 parts of polymer solution containing 1.5 wt % Jaguar C13S, 0.75 wt % Chitosan, 0.10 wt % Merquat 100, 0.35% acetic acid and 0.05 wt % cocoamido propylbetaine at 300 rpm for 15 minutes using an overhead stirrer. The resulting emulsion contained silicone oil droplets with size ranging from 2 μm to 60 μm dispersed in the polymer solution.

The extrusion process described in Example 3 was used to prepare 14.3 wt % dispersions (5 wt % silicone oil based on the total composition) of the hydrogels. The surfactant system was the same as the one used in Example 3 (Table 3) except 0.3 instead of 0.97% of Antil 141 was used in the formula. The hydrogel dispersion comprised noodle shaped particles dispersions that contained dispersed silicone oil having an average droplet size in the range of 2–60 μm.

The deposition of silicone oil from the composition of Example 6 (this example) shown in Table 6 The deposition tests were carried out according to the method described in Example 5 The dispersion exhibited a similar depositions to other hydrogels having similar silicone droplet size suggesting that the nature and characteristics of the dispersions may be more important in determining the level of deposition than is the exact polymer that is employed.

TABLE 6

Deposition of silicone oil onto pig skin from cleansing compositions containing dispersed hydrogels.

| Sample No. | Si:S |
|---|---|
| Example 6 | 6.78 |
| Control (same control as in Table 5) | 0.3 |

Example 7
Illustration of the Enhanced Deposition Produced by Hydrogels

One of the benefits of using the hydrogel dispersions of this invention is the enhanced deposition provided to agents that are incorporated within their structure relative to the agents used by itself. This example illustrates the effect for silicone oil. In particular, deposition of silicone oil from various skin cleansing compositions were compared in the deposition test described in Example 5. A set of compositions was prepared by directly emulsifying 60,000 cps silicone into the cleansing composition of Table 3 to make the droplet size of silicone oil about the same as those contained in the hydrogel dispersions of Examples 3A, 3B and 6.

The deposition results of hydrogel dispersions vs. silicone emulsion alone are summarized in Table 7 and demonstrate that substantial enhancements in deposition can be achieved by incorporating the agent within a dispersed hydrogel domain.

TABLE 7

Enhancement of deposition of silicone oil from hydrogel[a].

| | | Deposition Level[b] | |
|---|---|---|---|
| Sample No. | Silicone oil Droplet Size | Si/S Ratio Silicone in Hydrogel | Si/S Ratio Silicone Emulsions Alone[c] |
| Example 3B | 2–30 μm | 7.1 | 1.2 |
| Example 3A | 40–100 μm | 28.0 | 8.3 |
| Example 6 | 2–60 μm | 6.78 | 2.0 |

[a]All compositions employed the surfactant base listed in Table 3. The concentration of silicone oil in the final composition was 5 wt % in all cases.
[b]Deposition was measured by the ex-vivo method described in Example 5.
[c]The same silicone oil were used in the preparation of the skin cleansing compositions by directly emulsifying the silicone oil into the skin cleanser.

Example 8
Preparation of Hydrogel Dispersion Containing Hydrocarbon Oils

A wide variety of ingredients can be incorporated into the hydrogel dispersion of this instant invention. Previous examples have illustrated several general features of these dispersions using silicone oils. Another class of useful materials are hydrocarbon oils. Some of the benefit agents of this class of materials are moisturizing agents such as petrolatum, emollients such as isopropyl palmitate and sunscreens such as Parsol MCX (2-Ethylhexyl-P-Methoxy Cinnamate). These examples illustrates the use of hydrogels to deliver such hydrocarbon oils.

Preparation of Hydrogel Precursor Solution

40% emulsions of different hydrocarbon oils i.e. 100% petrolatum, a mixture of 50% isopropyl palmitate and 50% petrolatum, and a mixture of 50% Parsol MCX and 50% of petrolatum were prepared by mixing 40 parts of the hydrocarbon oil to 60 parts of aqueous polymer solution which contained 0.5 wt % Chitosan (first polymer) (Seacure 343 ex Pronova Biopolymer), 1.9 wt % Jaguar C13S (second polymer), 0.4 wt. % cocoamido propylbetaine and 0.25 wt. % acetic acid at 300 rpm for 20 minutes using an overhead stirrer. The mixing was done at room temperature except 100% petrolatum sample. The 100% petrolatum emulsion was prepared by melting the petrolatum at 60° C. which was then added to the room temperature polymer solution and mixed at room temperature.

Preparation of Hydrogel Dispersion by Coextrusion

The extrusion process described in Example 3 was used to prepared 12.5 wt % dispersion of the hydrogels containing 100% petrolatum, 50%Isopropyl palmitate/50% petrolatum, and 50% Parsol MCX/50% petrolatum respectively for examples 8A, 8B and 8C. The surfactant system was the same as the one used in Example 3 (Table 3) except no Antil 141 was used in the formula. All these samples comprised noodle shaped hydrogel dispersions with diameter about 1000 nm.

Examples 9
Preparation of Hydrogel Dispersion Containing Solid Fatty Acid

Previous examples have illustrated a wide variety of hydrophobic oils can be incorporated into the hydrogel dispersions of the instant invention. Another class of useful materials are dispersed hydrophobic solids or waxy particles. Some of the benefit agents within this class of materials are moisturizing agents such as fatty acids, emollients, certain solid sunscreens such as P hydroxybenzoic acid, antimicrobial agents such as triclosan, and anti-acne agents such as salicylic acid.

This example illustrates the use of hydrogels to deliver such solid or waxy hydrophobic solids using a mixture of solid fatty acids as the specific example.

Preparation of Hydrogel Precursor Solution.

22 grams of a modified corn starch (Capsul ex. National Starch & Chemical), 4.4 grams of Carrageenan (Gelcarin GP911 ex. FMC) and 0.55 gram of sodium lauryl sulfate (ex BDH) were dissolved in 83.05 grams of deionized water at 80° C. 210 grams of a molten fatty acid mixture containing 50 wt % of palmitic acid and 48 wt % of stearic acid was added to the above polymer solution and emulsified to form a fatty acid emulsion at 60° C. The fatty acid emulsion was then transferred to a Hobart Kitchen Aid mixer and mixed while cooling to form a viscous dough-like fatty acid emulsion. The emulsion comprised fatty acid particles with a size in the range of 1 to 40 μm in diameter.

The above composition then mixed with an equal amount of polymer solution containing 4% of Merquat 100 (ex. Calgon), 0.5% of Chitosan (Sea Cure 340 ex. Protan) and 0.4% of acetic acid to form a hydrogel precursor solution containing dispersed fatty acid.

Preparation of Hydrogel by Extrusion 14 parts of the hydrogel precursor solution was then coextruded with 86 parts of the liquid cleanser of Table 3 using the method described in Example 3 to form hydrogel dispersion. This dispersion consisted of noodle shaped gel particles uniformly distributed in the surfactant composition.

Example 10
Further Illustration of Hydrogel Dispersion Containing Solid Fatty Acid This example is very similar to the previous one except that a different gel forming polymer was employed.

Preparation of Hydrogel Precursor Solution 22 grams of a modified corn starch (Capsul ex. National Starch & Chemical), 4.4 grams of Carrageenan (Gelcarin GP911 ex. FMC) and 0.55 gram of sodium lauryl sulfate (ex BDH) were dissolved in 83.05 grams of deionized water at 80° C. 210 grams of a molten fatty acid mixture containing 50 wt % of palmitic acid and 48 wt % of stearic acid was added to the above polymer solution and emulsified to form a fatty acid emulsion at 60° C. The fatty acid emulsion was then transferred to a Hobart Kitchen Aid mixer and mixed while cooling to form a viscous dough-like fatty acid emulsion. The emulsion comprised fatty acid particles with a size in the range of 1 to 40 μm in diameter.

The above composition was then mixed with an equal amount of a polymer solution containing 10 wt % of fully hydrolyzed polyvinyl alcohol solution (Airvol 350 ex. Air Product).

Preparation of Hydrogel by Extrusion 14 parts of the hydrogel precursor solution was then coextruded with 86 parts of the liquid cleanser of Table 3 using the method described in Example 3 to form hydrogel dispersion. This dispersion, consisted of noodle shaped gel particles uniformly distributed in the surfactant composition.

Example 11
Deposition of Fatty Acid from Liquid Cleanser

The deposition of fatty acid onto pig skin was measured by a gas chromatograph method. A 2 inches by 2 inches piece of pig skin was first washed with about 0.35 grams of liquid cleanser for one minute. The treated pig skin was then rinsed with water for 50 seconds. The skin was dried once using a paper towel, air dried for two minutes and then extracted with 10 grams of heptane for 30 minutes. Aliquats of the heptane solution were injected into a GC to determine the amount of fatty acid deposited onto the skin. A control sample comprised 7 parts water, 7 parts of the fatty acid emulsion used to prepare the dispersions in Examples 9 and 10 and 86 parts of the surfactant composition listed in Table 3 (also used to prepare Examples 10 and 11). The amount of fatty acid deposited from Examples 9 and 10, are compared with the control in Table 8. The result demonstrate that significant deposition of fatty acid occurs from these hydrogel dispersions. Furthermore, as with silicone oil, incorporating the fatty acid in the hydrogel formulation significantly increases its deposition (compare Examples 9 and 10 with control).

TABLE 8

Deposition of fatty acid from hydrogel dispersions under conditions typical of skin cleansing.

| Sample No.(a) | Deposition of Fatty Acid μg/cm² |
|---|---|
| Example 9 | 5.10 |
| Example 10 | 4.2 |
| Control(b) | <0.5 |

(a)All sample contained 4 wt % fatty acid and the same fatty acid emulsion was used to prepare all the samples.
(b)The control was prepared by mixing 7 parts of the fatty acid emulsion used to prepare Examples 9 and 10 with 7 parts of water first which is then mixed with 86 parts of the surfactant composition of Table 3.

Example 12
Preparation of Hydrogel Dispersion Containing Lipid

A molten lipid solution was prepared by heating 30 parts glycerol, 15 parts Cholesterol (Cholesterol USP ex. Croda Chemicals LTD), 7.5 parts sugar ester (Ryoto S270 ex. Mitsubishi-Kasei Foods Corp.) and 7.5 parts stearic acid (ex. Unichema International) on a 150° C. hot plate. The clear molten lipid solution was then cooled to about 98° C. and mixed with 10 parts of neutralized Aculyn 33 (ex. Rohm & Haas, 2 wt %, pH: 7.5–8.0) solution and 30 parts of Carrageenan Gelcarin GP911 solution (2 wt %) to form the hydrogel dispersion precursor containing Cholesterol.

The extrusion process described in Example 3 was used to prepare 17 wt % dispersion (2.55 wt % Cholesterol based on the total composition) of the hydrogel. Same surfactant system as Example 3 (Table 3) was used for the preparation. Deposition of Cholesterol from this cleansing composition was determined in Example 13. A comparative example containing 2.5 wt % Cholesterol uniformly dispersed in a liquid cleanser was prepared for comparison. The composition and the preparation process of this comparative example are given in Table 9 below

TABLE 9

| Ingredient | % a.i. |
|---|---|
| Cholesterol | 2.50 |
| Stearic Acid | 1.25 |
| Sucrose Ester | 1.25 |
| Glycerol | 5.00 |
| Genapol ZRO (SLES) | 16.0 |
|  | Sodium Lauryl Ether Sulfate |
| Amonyl 380BA (CAPB) | 2.00 |
|  | Cocylamidopropylbetaine |
| Jaguar C-13-S | 0.25 |
| NaCl | 0.30 |
| Water and minors | to 100% |

Preparation

Melt glycerol, sucrose ester, stearic acid and cholesterol together on a hot plate. Premix the surfactants and the excess water. Add the surfactants to the lipid/glycerol mixture then add the Jaguar. Preserve the system and pH adjust to 5.3. Adjust the viscosity using NaCl to 5000 mPas at $10s^{-1}/25°$ C.

Example 13
Deposition of Cholesterol on Skin

The deposition of cholesterol onto pig skin from cleansing compositions was determined by the following method. 0.25 grams of cleanser was rubbed 50 times on a 5×5 cm² pig skin that was prewefted with tap water. The skin was then rinsed for 10 seconds with deionized water and patted dry with a paper towel. 3 ml of ethanol was used to extract the cholesterol from the skin for analysis.

The amount of cholesterol extracted from the skin was determined by spectrophotometric method. The ethanol extraction was dried at 80° C. oven. 100 μl methanol was added to the dried content. 1,000 μl aqueous cholesterol reagent from Sigma was added to the sample and left for 5 minutes to react with the extracted cholesterol. The aqueous cholesterol solution was then mixed with 500 μl chloroform and poured into microcentrifuge tubes. Chloroform was separated from the aqueous solution by centrifuging the tubes at 13,000 rpm for 5 minutes. After centrifugation the top clear aqueous layer was pipetted into curvets and the absorbance at 500 nm was measured using a spetrophotometer and a standard calibration curve to determine the amount of cholesterol extracted from the skin.

The amount of cholesterol extracted from the skin treated with Example 12 are compared with two controls in Table 10. The data shows that significant deposition of cholesterol was achieved from the hydrogel sample of Example 12 as compared to the two controls.

TABLE 10

Deposition of Cholesterol from shower gel

| Sample No. | Deposition of cholesterol $\mu g/10 \text{ cm}^2$ |
|---|---|
| Example 12 | 48.4 |
| Control 1[a] | 26.5 |
| Control 2[b] | 21.1 |

[a]Control 1 is liquid cleanser contains 2.5 wt. % well dispersed cholesterol. The composition and preparation are given in Table 9.
[b]Control 2 is a liquid cleanser without containing any cholesterol. The amount of cholesterol given in the table is the cholesterol extracted from the pig skin.

Example 14

A liquid cleanser containing 10 wt % of silicone hydrogel (5 wt % silicone oil of the total composition) and 90 wt % of surfactant composition of Table 3 with 0.3 wt % instead of 0.97% Antil 141 was prepared using the process described in Example 3. The silicone hydrogel precursor solution containing 50 wt % 60,000 cps silicone oil, 0.47 wt % Carrageenan GP911, 0.155 wt % Aculyn-33, 0.31 wt % polyvinyl alcohol (Airvol 540 ex Air Product) and 24.06 wt % water was prepared the same way as described in Table 3. The hydrogel precursor solution contains silicone oil droplets with size in the range of 5 to 60 micrometers.

Effect of the silicone hydrogel containing cleanser on consumer's after-use skin feel compared to the liquid cleanser without silicone hydrogel dispersion was evaluated using the protocol described below. The test site for this evaluation is the volar surface of the forearm. Hand and forearm were prewefted by holding under running tap water (30° C.) for approximately 15 seconds. 3.5 grams of the hydrogel containing liquid cleanser was then dispensed onto the hand and the assigned arm was washed for 20 seconds and rinsed under running water for 10 seconds. The forearm was patted dry with a paper towel. The procedure was repeated for the other arm using the same cleanser without containing the silicone hydrogel. All panelists were asked to determine their perception of after use skin feel. 7 out of the 8 panelists felt a difference in after-use skin feel and 5 out of those 7 preferred the skin feel of the arm treated with the silicone hydrogel containing liquid cleanser.

Example 15
Preparation of Hydrogel Dispersions as Skin Lotions

This example showed that hydrogel dispersions can be prepared using aqueous solution composition suitable for skin care application. In this example an aqueous solution composition containing 0.9 wt % Nitrosol 250 HHR (ex. Aqualon), 0.06 wt % Carbopol C981 (ex. BF Goodrich), 0.4 wt % Na3PO4 and 0.05wt % Glydant Plus without any surfactant was prepared for hydrogel preparation.

A petrolatum hydrogel precursor solution was formed by mixing 10 parts of petrolatum (Snow White ex. Penreco) to 90 parts of aqueous polymer solution containing 0.6 wt % chitosan (Seacure 343 ex. Protan), 0.4 wt % acetic acid and 1.8 wt % Jaguar C13S (Rhone-Poulenec) at 60° C., 300 rpm for 15 minutes using an overhead mechanical stirrer. The emulsion so prepared contained petrolatum droplet with size in the range of 1 to 30 um. 25 parts of the petrolatum hydrogel precursor solution was injected into 75 parts of aqueous solution composition to form elongated hydrogel noodles using #14 gauge syringe needle. The aqueous composition containing the petrolatum hydrogel noodles were then passed through a screen having mesh size 200 um to form the hydrogel dispersions. This sample contained large soft hydrogel particles concentrated with petrolatum droplets and is suitable for skin care application.

Example 16
Effect of Process Condition on Hydrogel Formation

This example showed that formation of hydrogel particles depends on the mixing device used to incorporate the hydrogel precursor solution into the aqueous solution composition. The preferred process, extrusion/low-shear mixing process, provides a better control on the hydrogel particle size and has better retention of water insoluble benefit agent inside the hydrogel particles.

A silicone hydrogel precursor solution was prepared by mixing 30 parts of 60,000 cps silicone oil in 70 parts of polymer solution containing 0.4 wt % Seacure 343, 0.2 wt % acetic acid and 2.0 wt % Jaguar C13s at 60 rpm for 7 minutes using an overhead mechanical mixer. The silicone emulsion so prepared contained 30 wt % silicone oil with particle size about 132 um.

Two aqueous liquid cleansers with different viscosity were prepared for hydrogel processing. These two aqueous solution composition with composition shown in Table 11 all contained 17.5 wt % surfactants thickened with 0.4 wt % Carbopol ETD2020 and 0.4 wt % Bentone. The viscosity of these two cleanser was 15,000 cps and 3,500 cps respectively and had a pH around 7.8. Two processes, a batch process and a coextrusion/in-line mixing process, were used to make large hydrogel dispersions in these two liquid cleansers.

In the batch process, 15 parts of above silicone hydrogel precursor solution was added to 85 parts of liquid cleanser and mixed at 60 rpm for 15 minutes using an overhead mixer. The equipment described in example 3 was used for the coextrusion/in-line mixing process. 15 parts of silicone hydrogel precursor solution was coextruded with 85 wt % of the liquid cleanser through the two fluid nozzle to form elongated soft hydrogel noodles. The prehardened hydrogel noodles were then continuously passed through a low shear in-line mixing device at the rate of 20 cc/minute to break the hydrogel noodles into hydrogel particles. Two different in-line mixing devices were used to break the hydrogel noodles. One is a static in-line mixer with ¼" in diameter and 6" in length. The other in-line mixer containing two identical screens having mesh size about 200 um. Both the hydrogel particle size and % of silicone oil retained inside the hydrogel gel particles were shown in table 12. The results clearly showed that the coextrusion/in-line mixing process had much better control on the size of hydrogel particles and also provided much better entrapment of oil inside the formed hydrogel particles during the process than the direct mixing batch process.

TABLE 11

Liquid cleanser composition of Example 16

| Raw Material | Supplier | low viscosity liquid cleanser | high viscosity liquid cleanser |
|---|---|---|---|
| Tegobetaine F | Goldschmidt | 26.7% | 26.7% |
| Standapol EA-2L | Henkel | 18.0% | 18.0% |
| Jodapon CI-ADH | PPG-Mazer | 5.8% | 5.8% |
| DC2501 silicone wax | Dow Corning | 1.0% | 1.0% |
| Bentone Clay | Rheox | 0.4% | 0.4% |
| Carbopol ETD2020 | BF Goodrich | 0.45% | 0.45% |
| Glycerine | Fisher | 2.5% | 2.5% |

TABLE 11-continued

Liquid cleanser composition of Example 16

| Raw Material | Supplier | low viscosity liquid cleanser | high viscosity liquid cleanser |
|---|---|---|---|
| Isopropanol | | 2.0% | 0% |
| Perfume | Givaudan-Roure | 1.0% | 1.0% |
| Glydant Plus | Lonza | 0.2% | 0.2% |
| DI Water | | to 85% | to 85% |

TABLE 12

Hydrogel particle size and % oil retained of example 16

| | Low viscosity liquid cleanser | | High viscosity liquid cleanser | |
|---|---|---|---|---|
| | Gel Size | % Oil Retained | Gel Size | % Oil Retained |
| Direct Mixing | 392 um | 68% | >710 um | 41% |
| Coextrusion/ Static Mixer | 230 um | 85% | 140 um | 75% |
| Coextrusion/ Screen | 306 um | 88% | 326 um | 84% |

We claim:

1. An aqueous composition comprising:
   (a) 40–95% by weight aqueous solution having a viscosity greater than 300 centipoises; and
   (b) 5% to 60% by wt. of a hydrogel composition comprising:
      (i) 0.1 to 30% by wt. hydrogel composition of at least one polymer soluble in water which polymer is insolubilized when placed in the aqueous solution of item (a);
      (ii) 0.2 to 30% by wt. hydrogel composition of a polymer soluble in water, and soluble or dispersible in the aqueous solution of item (a); and
      (iii) 1.0 to 60% water insoluble benefit agent entrapped in a network formed by (i) and (ii);
   wherein said particles of said benefit agent (iii) have particle size of 0.2 to 200 micrometers;
   wherein said hydrogel is greater than 25 micrometers; and wherein the size of the hydrogel (b) is greater than that of the benefit agent.

2. A composition according to claim 1, wherein polymer of (i) is insolubilized, when contacted with the aqueous solution of item (a), by thermal gelation.

3. A composition according to claim 2, wherein said gel forming polymer is selected from the group consisting of gel forming polysaccharides, gel forming proteins, and thermally gelling synthetic polymers.

4. A composition according to claim 3, wherein the gel forming polysaccharide is carrageenan or agar.

5. A composition according to claim 2, wherein said gel forming polymer is a gel forming protein.

6. A composition according to claim 5, wherein said protein is a gelatin.

7. A composition according to claim 2, wherein said gel forming polymer is a synthetic polymer selected from the group consisting of N-acrylamides and homo or copolymers of polyacrylate or methacrylate containing polymers incorporating an acrylic or methacrylic ester of a long chain branched or straight chain alcohol.

8. A composition according to claim 1, wherein polymer of (i) is insolubilized, when contacted with the aqueous solution of item (a), by precipitation or coacervation.

9. A composition according to claim 8, wherein precipitation or coacervation is caused by change in pH.

10. A composition according to claim 8, wherein precipitation or coacervation is caused by change in electrolyte concentration.

11. A composition according to claim 10, wherein polymer (i) sensitive to electrolyte concentration of aqueous solution is selected from the group consisting of polyvinyl alcohol having MW greater than 13,000 and degree of hydrolysis 78% to 100%; and hydroxyalkylcellulose.

12. A composition according to claim 1, wherein polymer of (i) is solubilized by cross-linking with a cross-linker present in the aqueous solution of item (a).

13. A composition according to claim 12, wherein polymer (i) is carrageenan and cross-linker is potassium ion.

14. A composition according to claim 12, wherein polymer (i) is alginate and cross-linker is calcium ion.

15. A composition according to claim 12, wherein polymer (i) is polyvinyl alcohol and cross-linker is borax ion.

16. A composition according to claim 1, wherein property modifying polymer (ii) is selected from the group consisting of:
   (a) carboxylic acid containing acrylic polymers;
   (b) nonionic polymers selected from the group consisting of polyvinyl alcohol, polyvinyl pyrrolidone, modified corn starch and hydroxyalkyl cellulose or hydroxyalkylmethyl cellulose; and
   (c) cationic polymers.

* * * * *